(12) United States Patent
Pearson

(10) Patent No.: US 6,768,943 B2
(45) Date of Patent: Jul. 27, 2004

(54) SYSTEM AND METHOD USING ENVIRONMENT MEMORY HAVING SIGNATURES

(75) Inventor: Jeffery Pearson, Peoria, AZ (US)

(73) Assignee: Aviation Communication & Surveillance Systems, LLC, Phoenix, AZ (US)

( * ) Notice: Subject to any disclaimer, the term of this patent is extended or adjusted under 35 U.S.C. 154(b) by 0 days.

(21) Appl. No.: 10/126,643

(22) Filed: Apr. 18, 2002

(65) Prior Publication Data

US 2003/0200026 A1 Oct. 23, 2003

(51) Int. Cl.[7] .................................................. G05D 1/00
(52) U.S. Cl. .............................. 701/301; 701/9; 342/29; 342/30
(58) Field of Search ............................. 701/301, 14, 3, 701/4, 9; 342/29, 30

(56) References Cited

U.S. PATENT DOCUMENTS

| | | |
|---|---|---|
| 5,488,563 A | 1/1996 | Chazelle et al. |
| 5,521,849 A | 5/1996 | Adelson et al. |
| 5,638,282 A | 6/1997 | Chazelle et al. |
| 5,854,932 A | 12/1998 | Mariani et al. |
| 5,893,910 A | 4/1999 | Martineau et al. |
| 5,991,774 A | 11/1999 | Tate et al. |
| 5,999,990 A | 12/1999 | Sharrit et al. |
| 6,021,374 A | 2/2000 | Wood |
| 6,041,035 A | 3/2000 | Thedens |
| 6,072,994 A | 6/2000 | Phillips et al. |
| 6,105,154 A | 8/2000 | Wang et al. |
| 6,163,842 A | 12/2000 | Barton |
| 6,347,263 B1 | 2/2002 | Johnson et al. |
| 2002/0010542 A1 | 1/2002 | Ahrens et al. |

OTHER PUBLICATIONS

"Product Specification for the MK XXII Helicopter Enhanced Ground Proximity Warning System (EGPWS)," Copyright 2000, 2002 Honeywell International Inc., Redmond, Washington.

*Primary Examiner*—Yonel Beaulieu
(74) *Attorney, Agent, or Firm*—William R. Bachand; Squire, Sanders & Dempsey L.L.P.

(57) ABSTRACT

A system having replaceable subsystems is operable in a certified configuration after installation of a replacement subsystem. The system includes several subsystems each installed at an interface. For each subsystem, the interface includes memory having a description of the operating environment for that subsystem. The memory stores modules each having a signature, for example, a cyclic redundancy code (CRC). After installation of a replacement subsystem, a processor in the subsystem checks a list of signatures. Each signature corresponds to a module that is certified for use by an application program of the subsystem. If a listed signature corresponds to a module that is available in the memory, is desirable to be used, and the subsystem is not presently configured to use such a module, the subsystem reads the module, integrates the data of the module into an operating configuration, and operates thereafter in accordance with the updated operating configuration. In one implementation, an aircraft collision avoidance system includes one or more replaceable subsystems that each read a memory in a tray of the cockpit interface and configure themselves for updated operation.

104 Claims, 6 Drawing Sheets

US 6,768,943 B2

SYSTEM AND METHOD USING ENVIRONMENT MEMORY HAVING SIGNATURES

FIELD OF THE INVENTION

Embodiments of the present invention relate to determining whether a configuration for an installed subsystem is suitable for operating the subsystem and to providing to an installed subsystem data for a suitable configuration.

BACKGROUND OF THE INVENTION

Conventional systems are packaged to facilitate maintenance and upgrades by permitting portions of a system to be removed and replaced with a functionally compatible replacement portion. Such portions may be equivalently referred to as subsystems, system components, replaceable units, or line replaceable units (LRUs). A subsystem may be operated by itself apart from the rest of the system for testing, though such operation may be somewhat different from typical system operation, for example, to facilitate diagnostics, analysis of extreme conditions, measurement, calibration, monitoring of internal signals, debugging, or special purpose tests. The specified performance of a subsystem is typically defined for system level operations and may also be defined at the subsystem level by specifying sequences of inputs and acceptable outputs of the subsystem.

Certifying the performance of a subsystem typically includes ascertaining and recording the identity and configuration of the subsystem, isolating the subsystem from other system components (e.g., to assure performance isn't masked by other subsystems), conducting tests using instrumentation that has been properly calibrated, recording that each step of a test was performed properly with an acceptable result, and recording that all testing was completed satisfactorily. The time, labor, equipment utilization, and management associated with certifying a subsystem represent a costly investment aimed at assuring proper operation of the system under all system operating conditions.

Conventional subsystem design in electronics and software places emphasis on modular design techniques for decreasing development time. These modules may be circuits, circuit assemblies, memory devices, integrated circuits, application specific integrated circuits, or portions of software handled as a unit during software development processes. Such portions of software may include data or instructions in any form readable by human programmers or machines. Subsystems as a whole, and all internal modules, may be designed to perform according to one or more predefined configurations. Typically, a configuration corresponds to prescribed conditions of signals at an electrical interface of the subsystem or module, or to prescribed contents of a memory device. A configuration may establish an initial operating mode (or set of modes) or may, upon configuration change, establish a different mode (or set of modes) for further operations.

Conventional subsystems have been designed to operate with centralized control of subsystem modules. For example, all hardware and software modules for an airplane cockpit system function such as a collision avoidance system computer for a collision avoidance system have been packaged as a line replaceable unit. Also, a system may be installed in a variety of environments, each characterized by different system operations or operational modes. Consequently, for a given subsystem, all modules that may be necessary or desirable for all system environments have typically been included in the subsystem. As the number of environments and the complexity of the system and subsystem increase, the cost of certification of the subsystem has dramatically increased.

Without systems and methods of the present invention, further development of systems and subsystems may be impeded. Development, operating, and maintenance cost targets and performance reliability goals may not be met using conventional system design as discussed above. Consequently, important systems for assuring safety of personnel and equipment may not implemented to avoid injury, loss of life, and destruction of property.

SUMMARY OF THE INVENTION

A system, according to various aspects of the present invention, operates in an aircraft and includes several cooperating subsystems. At least one of the subsystems is coupled to an environment memory having content and a plurality of signature values of respective portions of the content. That subsystem includes a nonvolatile memory, an interface, and a processor. The nonvolatile memory includes content and at least one signature value of the content of the nonvolatile memory. The interface facilitates removal and replacement of the subsystem. The processor has access to the environment memory via the interface. The processor validates the content of the nonvolatile memory with reference to the signature value of the content of the nonvolatile memory, validates the content of the environment memory with reference to at least one signature value of the content of the environment memory, updates the content of the nonvolatile memory in accordance with the content of the environment memory, and performs a program in accordance with the updated content of the nonvolatile memory.

By using signatures stored in environment memory and in nonvolatile memory, the processor may easily recognize that the subsystem has been removed from one system and installed in another system. After updating the content of nonvolatile memory, the program operates in a certified configuration for the system where the subsystem is now installed.

A subsystem, according to various aspects of the present invention, operates in a system in accordance with contents of a system memory that is not part of the subsystem. The system memory includes content and a plurality of signature values of respective portions of the content of the system memory. The subsystem includes a nonvolatile memory, an interface, and a processor. The nonvolatile memory has content and a signature value of the content. The interface facilitates removal and replacement of the subsystem. The processor has access to the system memory via the interface. The processor validates the content of the nonvolatile memory with reference to the signature value of the content of the nonvolatile memory, validates the content of the system memory with reference to at least one signature value of the content of the system memory, updates the content of the nonvolatile memory in accordance with the content of the system memory, and performs an application program in accordance with the updated content of the nonvolatile memory.

A tray, according to various aspects of the present invention, accepts a replaceable subsystem. The tray includes an interface and a memory. The interface facilitates removal and replacement of the subsystem. The memory is coupled to the subsystem via the interface. The memory includes a plurality of signatures, each signature associated with a respective portion of the content of the memory. In one implementation, the memory is housed in the shell of a connector of a cable assembly that connects to the subsystem.

By storing a signature in the memory for each of several portions of content, the identity and certification status of that portion of content may be easily ascertained. Greater flexibility results in defining memory content when the identity of each portion of content is independent of its storage location in memory.

A method, according to various aspects of the present invention, operates a subsystem of an avionics system. The avionics system has a plurality of subsystems. The subsystem is packaged as a replaceable unit for installation via an interface of the subsystem. The subsystem includes a processor and a first memory. The system includes a second memory accessed by the subsystem via the interface. The method is performed by a processor of the subsystem and includes in any order: (a) determining a first calculated signature of a first content of the first memory; (b) comparing the first calculated signature with a first stored signature stored in the first memory to conclude validity of the first content; (c) determining a second calculated signature of the second memory, the second memory comprising a plurality of stored signatures for respective portions of the content of the second memory; (d) comparing the second calculated signature with a second stored signature stored in the second memory to conclude validity of the second content; (e) updating the first content in accordance with the second content in response to determining that the first content is valid and the second content is valid and a difference exists among at least two of the first calculated signature, the second calculated signature, the first stored signature, and the second stored signature; and (f) performing an avionics program in accordance with the updated first content.

By determining validity before performing an avionics program, the avionics program may be performed in a certified configuration.

A method, according to various aspects of the present invention operates a subsystem of an avionics system. The avionics system includes a plurality of subsystems. The subsystem being packaged as a replaceable unit for installation via an interface of the subsystem. The subsystem includes a processor and a first memory. The avionics system includes a second memory accessed by the subsystem via the interface. The method is performed by a processor of the subsystem. The method includes in any order: (a) determining whether first content of the first memory is not complete, determining being with reference to a preferences store of the subsystem; and (b) transferring second content from the second memory to the first memory, the second content being identified by a signature.

Use of a signature simplifies identification of portions of content to assure that a preferred certified configuration of an application program is used by the subsystem.

BRIEF DESCRIPTION OF THE DRAWING

Embodiments of the present invention will now be further described with reference to the drawing, wherein like designations denote like elements, and.

DETAILED DESCRIPTION OF THE PREFERRED EMBODIMENTS

Systems as discussed herein include electronic, electromechanical, and electro-optical, and electrochemical apparatus implemented to accomplish any system purpose or objective including machine control and process control in any field of endeavor, for example, manufacturing, transportation, and data processing, to name a few. Generally, a subsystem includes a few (e.g., one to twenty) assemblies (also called units) that communicate or coordinate to accomplish some of the functions desired to accomplish a system purpose. System design generally proceeds to define subsystems so as to reduce the extent of interaction between subsystems, in other words, to simplify the interfaces between subsystems.

Subsystems, according to various aspects of the present invention, are economically designed for certified operation in many different system environments. Subsystems may be associated with lower costs of operation, for example, operator training may be simpler, maintenance costs may be amortized more widely, and a smaller inventory of spare parts may be sufficient.

Systems may be maintained and upgraded by removing and replacing subsystems. A replacement subsystem may have more capability than the removed subsystem to effect a system upgrade. It is desirable to be able to use any replaceable subsystem of a given type as a replacement into any of a wide variety of systems designed generally for a type of subsystem. Common maintenance facilities are typically used to service a large number of systems that may have been deployed over a period of time and so consist of various versions of each of several subsystems. A system maintained and upgraded by removal and replacement of subsystems preferably uses certified subsystems designed for interoperability.

A system having replaceable subsystems, according to various aspects of the present invention, includes an interface at which a particular replaceable subsystem is removed and installed. After installation, the new subsystem performs a method as discussed below, that defines an operating configuration of the subsystem to assure that the subsystem will operate in a manner that conforms to predetermined operating specifications. Subsystems may be certified (e.g., after inspections, measurements, or tests) as operable within ranges of acceptable performance defined in a subsystem specification. Subsystems according to various aspects of the present invention reduce the labor and equipment used to accomplish subsystem certification.

Figure 1:
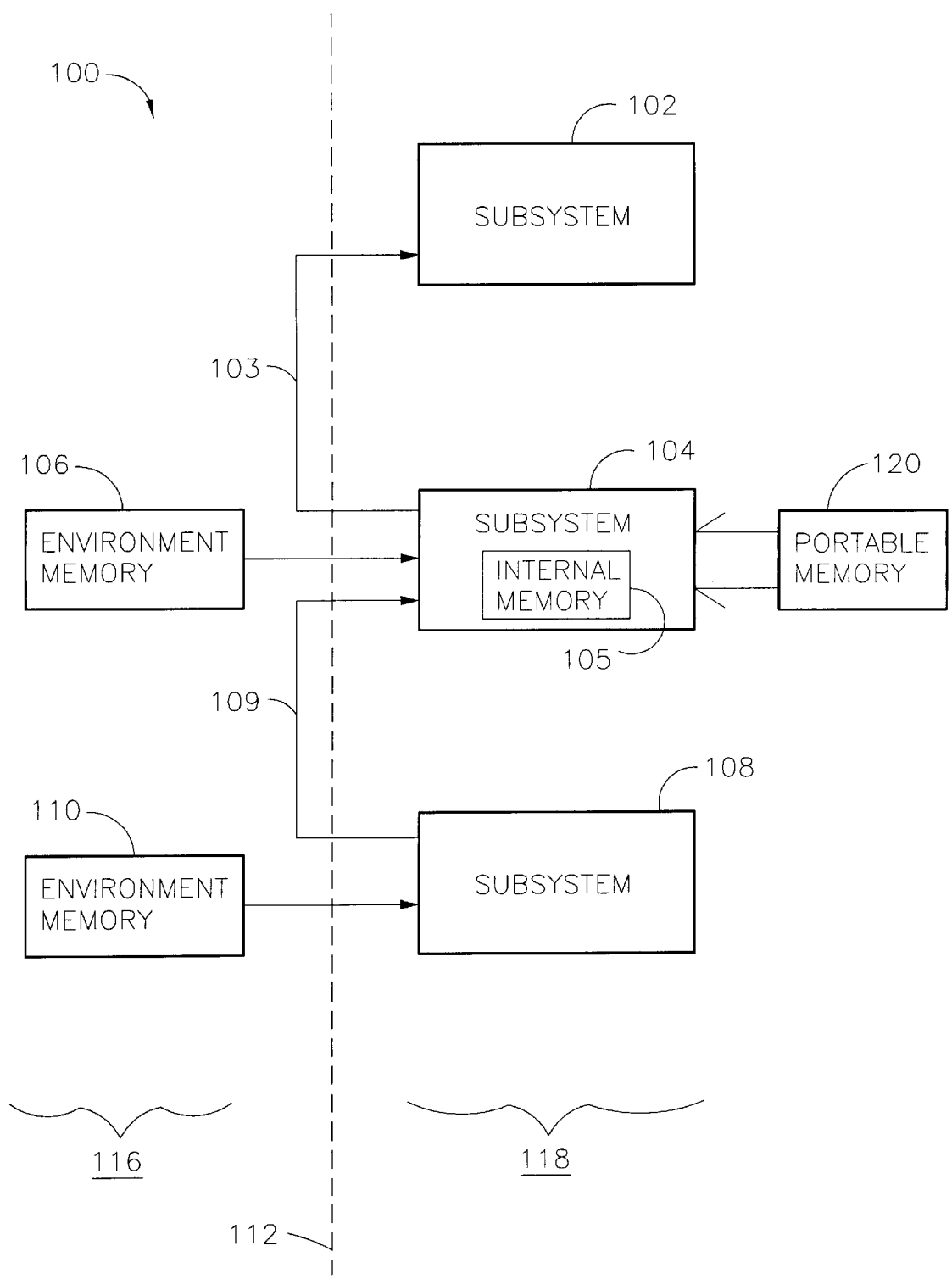
FIG. 1 is a functional block diagram of system according to various aspects of the present invention.
Figure 2:
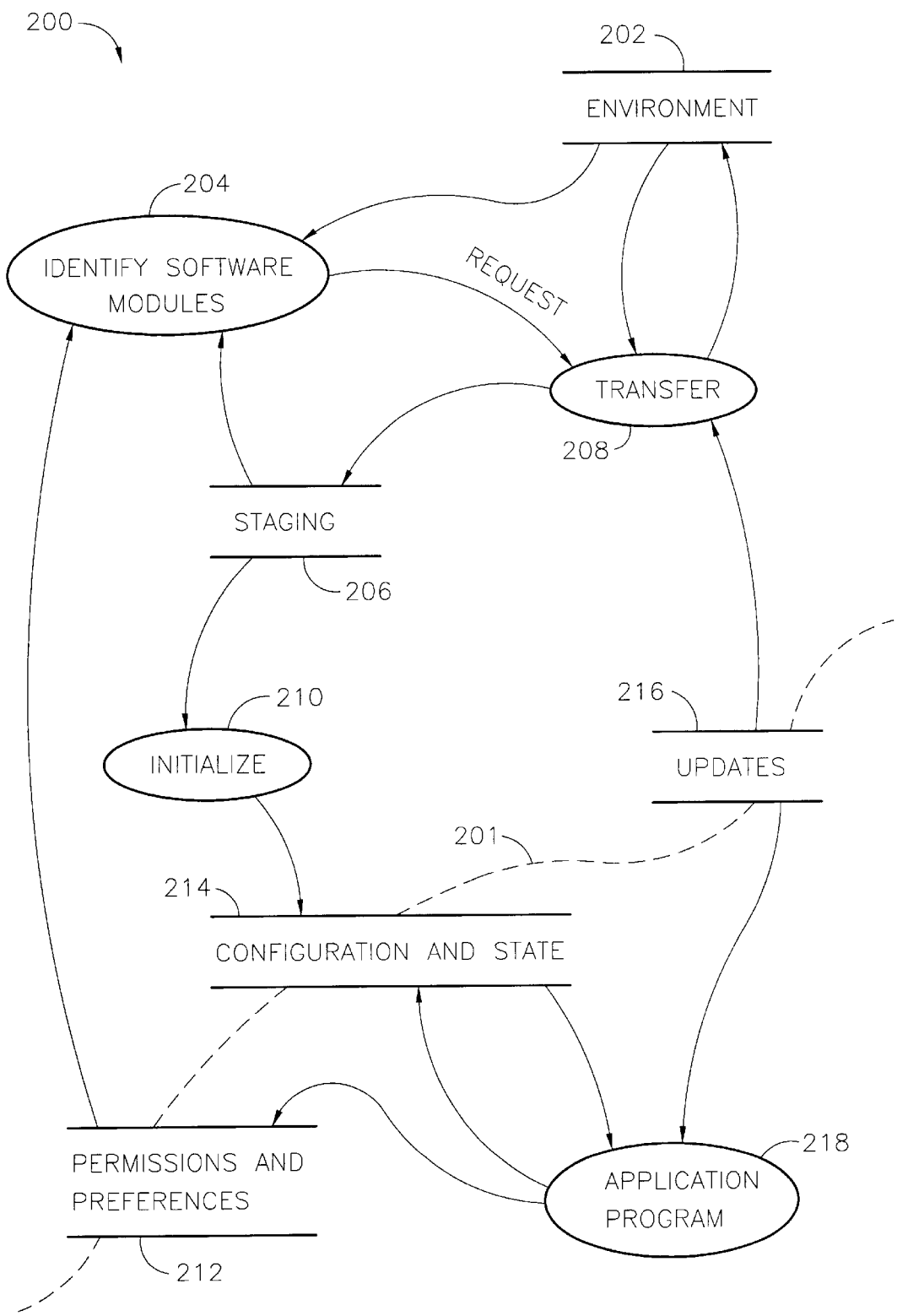
FIG. 2 is a data flow diagram of a process performed in the system of FIG. 1.
Figure 3:
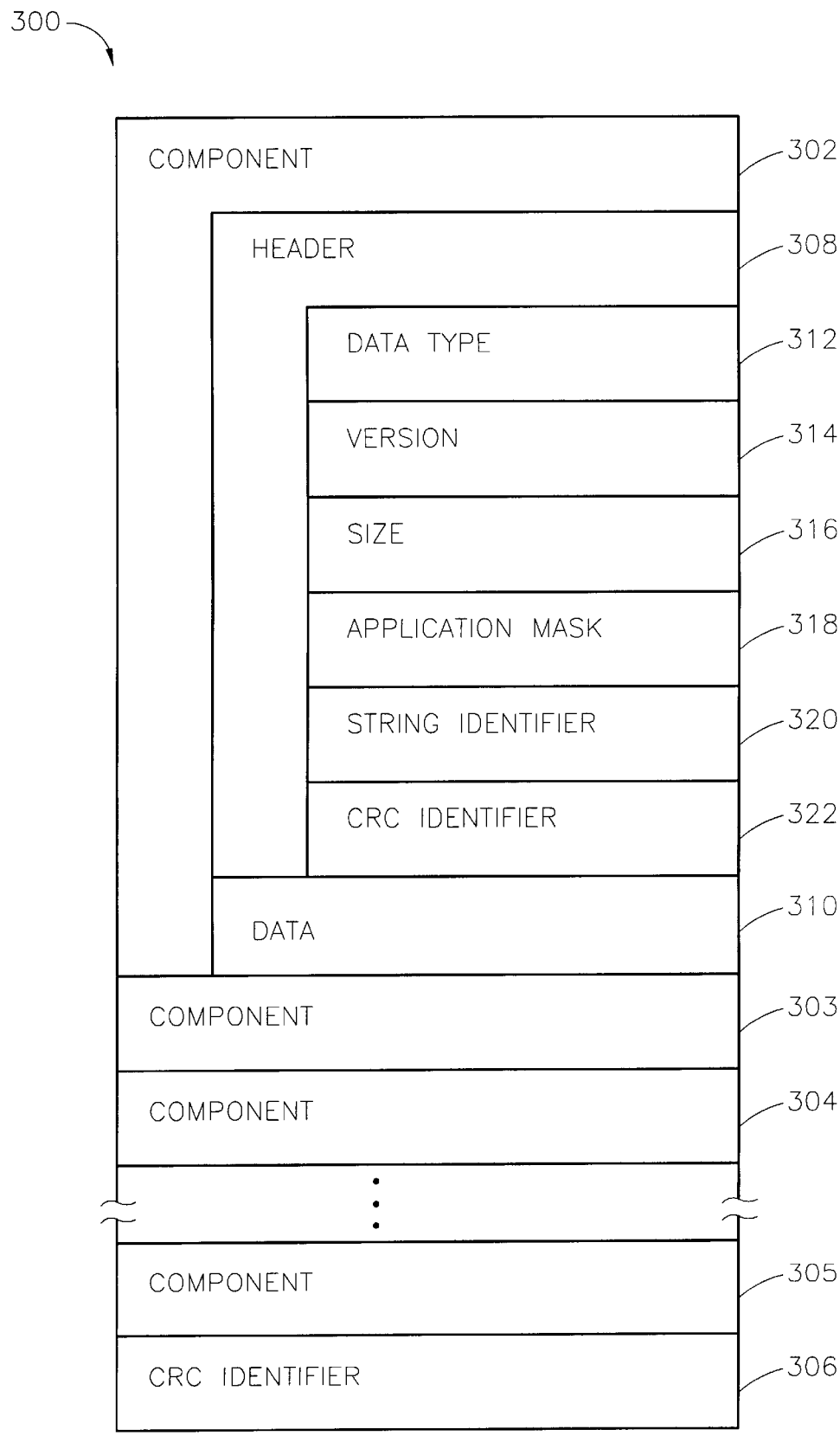
FIG. 3 is a data structure diagram of data stored in the environment memory of FIG. 1.
Figure 4:
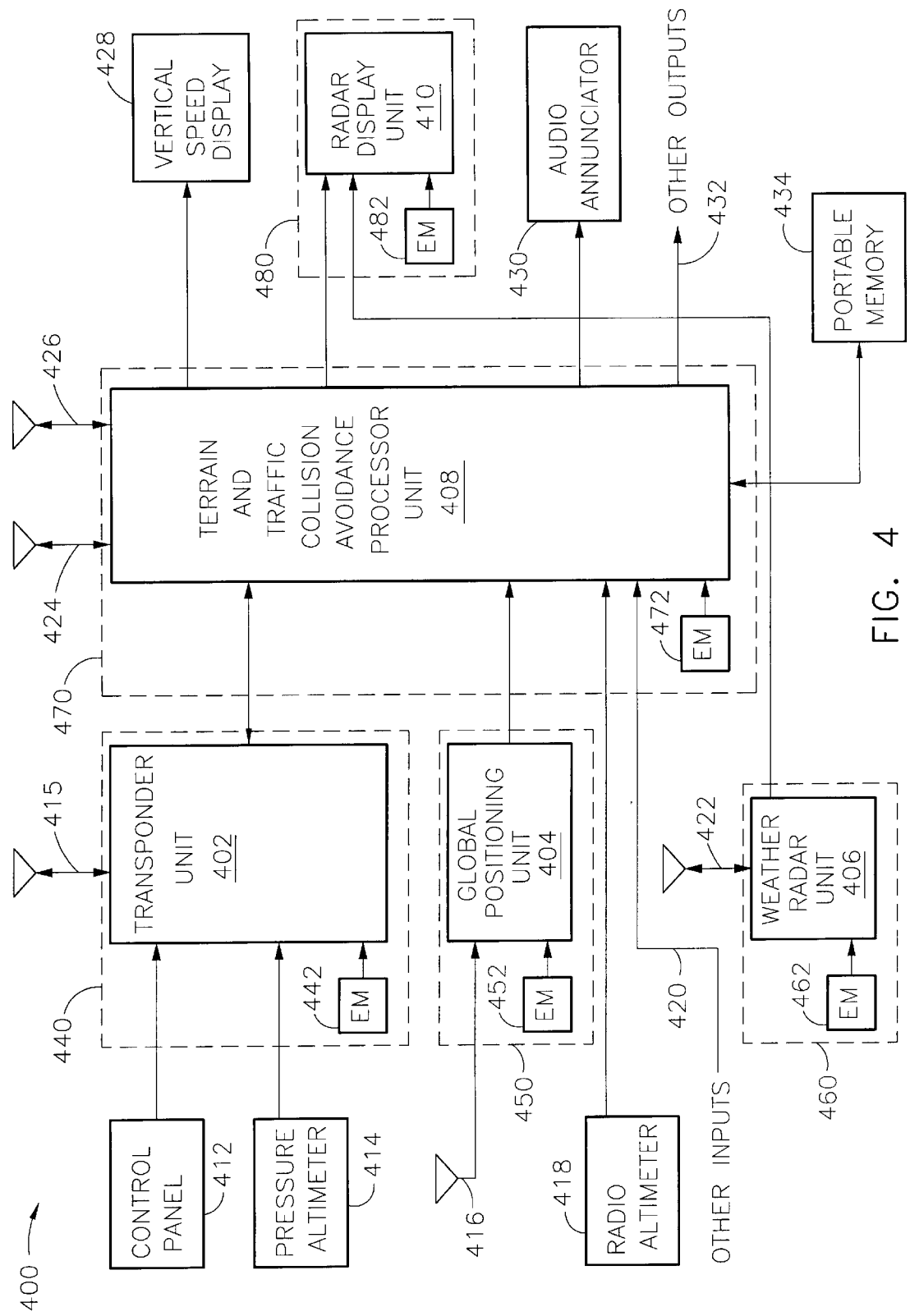
FIG. 4 is a functional block diagram for a collision avoidance system according to various aspects of the present invention.

For example, system 100 of FIGS. 1–3 includes subsystems 102, 104, and 108 that cooperate. An interface 112 couples subsystems 102, 104, and 108 for the exchange of electrical and/or optical communication and power signals. Interface 112 may include electrical cables and electrical connectors and mechanical supports (e.g., rack mounts, or trays) for the assemblies that constitute each subsystem. Interface 112 defines two sides 116 and 118. Interface 112 may be implemented in any convenient manner not necessarily a continuous surface or plane; and sides 116 and 118 may occupy any convenient spatial orientation including independent spaces, overlapping spaces, and enveloping spaces. Therefore, a side is a convenient term merely to distinguish in some systems a relatively less replaceable portion of a system (e.g., cable assemblies 103, 109, rack mounts, and trays) from a more easily replaceable portion (e.g., subsystems, or line replaceable units).

System 100 further includes environment memory 106 coupled to subsystem 104 and environment memory 110 coupled to subsystem 108. Environment memories 104 and 106 are located on side 116, the relatively less replaceable portion of system 100. According to various aspects of the present invention, a subsystem 104 (108) receives data from environment memory 104 (110) to accomplish configuration of the subsystem 104 (108) and to assure proper (e.g., certifiable or certified) operation of system 100.

An environment memory includes any memory device (e.g., electronic, magnetic, optical, rotating media, or solid state) that stores data used to define, establish, or modify a configuration of a subsystem for use by an application program performed by the subsystem. According to various aspects of the present invention, such data is organized in modules that may be stored in any manner convenient for read or write access. For example, modules describing interaction between subsystem 104 and 108 may be arranged contiguously after modules describing interaction between subsystem 104 and 102. Modules may provide, describe, or limit system functions, provide parameters used to determine system performance, identify or describe subsystems (e.g., type, version, or configuration of optional features), or describe interaction, cooperation, coordination, or priority among subsystems.

A module may include data structures (e.g., discrete data, contiguous storage of data conforming to a format, a record or records, a frame or frames, a page or pages, a linked list, an array, or a string). Because a data structure may include other data structures, the entire environment memory contents, and any mix of one or more components and/or modules may be implemented as a data structure.

The contents of environment memory may be loaded prior to system installation (e.g., read only memory), or may be updated (e.g., any nonvolatile memory) by transferring data from a subsystem to the environment memory. For example, subsystem 104 includes internal memory 105 that may store a working copy of data read from environment memory 106. Further, portable memory 120 may be coupled to subsystem 104 for transferring data from portable memory 120 to internal memory 105. Data from either portable memory or from internal memory may be transferred to update environment memory 106.

Environment memory 106 includes modules that describe the version, capabilities, and interface between subsystem 102 and subsystem 104; modules that describe the version, capabilities, and interface between subsystem 108 and subsystem 104; and modules that describe the environment of system 100, including behavioral parameters of system 100 and behavioral parameters for subsystem 104 behaviors (e.g., modes of operation, ranges of inputs and/or outputs, and criteria for decision making by subsystem 104).

A method, according to various aspects of the present invention, activates and updates a certified configuration of an application program of an installed replaceable subsystem. The method includes processes arranged to cooperate across an interface. The interface is defined to facilitate economical deployment of environment information in modules. For example, method 200 of FIG. 2 includes an environment side and an application side of an interface 201. The environment side includes environment store 202, identify software modules process 204, staging store 206, transfer process 208, and initialize process 210. Communication across interface 201 is implemented with access to a series of stores read and written by processes on opposite sides of the interface. The series includes permissions and preferences store 212, configuration and state store 214, and update store 216. The application program side of interface 201 includes application program process 218. Processes may be implemented in any conventional manner including single flow of control, polling, interrupt driven, multithreading, multitasking, and multiprocessing technologies. Any processes may be performed whenever data sufficient for that process is available. Method 200 is discussed below as implemented in internal memory 105 of subsystem 104. A corresponding method may be implemented in subsystem 108 with update store 216 omitted and commensurate simplifications of processes 208 and 218.

Environment store 202 provides nonvolatile storage of modules as discussed above. In one implementation, environment memory 106 (or 110) includes environment store 202 for use by subsystem 104 (or 108). Modules may be identified by a signature. The signature of a module may be stored with the module or stored separately. The signature of a module may be an assigned value or may be a derived value calculated at any time by analysis of the module. For example, a signature may be a parity, a cyclic redundancy code, or a serial number. The signature may be stored with the module overtly or covertly (e.g., as a watermark).

Permissions and preferences store 212 provides nonvolatile storage that includes a signature for each module that is required for a proper configuration of application program process 218. Typically, permissions and preferences store 212 includes signatures for numerous requirements for each of several proper configurations. In one implementation of store 212, for each configuration, each requirement is associated with a list of signature sets. Each list member (a signature set) is an alternative satisfaction of the requirement. For each configuration, store 212 may include permitted signatures or sets. In the absence of a complete preferred set, a permitted set may be used. In addition to sets that meet requirements, a permitted set may be used. Any particular members (e.g., a first member) of such a list may be expressly or impliedly designated as a preferred member. If a set is to be used to satisfy a requirement, then modules for every signature are typically loaded into staging store 206. A requirement is not met (and staging store 206 is incomplete) when less than all signatures of at least one set for that requirement are not present in staging store 206.

Identify software modules process 204 reads permissions and preferences store 212, determines the signatures corresponding to modules already loaded in stating store 206, and reads environment store 202 to determine the signatures of modules available there. If the modules already loaded in staging store 206 constitute a complete set, and no more preferred set of modules is available from environment store 202, identify software modules process 204 may omit requesting a transfer from transfer process 208. If the module corresponding to a required signature is not available from environment 202, an error condition is asserted. Otherwise, for each desired module as identified by its signature, identify software modules process 204 passes a request comprising the signature to transfer process 208.

Staging store 206 maintains in nonvolatile memory a list of signatures of modules that have been loaded from environment 202 by transfer process 208. Staging store may include other memory for some or all of the data of a loaded module. Preferably, when the data of a module is no longer needed by initialize process 210, memory used for storage of that data may be reused.

In another implementation, staging store 206 provides in nonvolatile memory a copy of environment memory 202. Identify software modules process 204 may compare some or all of staging store 206 to environment 202 and if different pass a general request for all of environment store 202 to be copied into staging store 206. For example, if a cyclic redundancy code read from (or calculated from) staging store 206 does not match a cyclic redundancy code read from (or calculated from) environment memory 202, a general transfer request is made.

Transfer process 208 reads environment store 202 and stores results in staging store 206. When updates are available from store 216, transfer process 208 reads update store 216 and writes results in environment store 202. Transfer process 208 may, prior to writing data in stores 202 or 206, apply data format conversions, calculate signatures, and store signatures with or apart from data written.

Initialize process 210 reads staging store 206, determines one or more suitable configuration values for use by application program process 218, and writes results in configuration store 214. Initialize process 210 may perform these functions when subsystem 104 is first coupled to environment memory 106 or at any time following a change in environment memory 106, for example, following an update write by transfer process 208 as discussed above. Initialize process 210 may reformat data read from store 206 prior to writing corresponding data into store 214. Initialize process 210 may read the state of application program process 218 from store 214 and defer updating configuration values until a suitable time to avoid unpredictable or unsuitable operations of subsystem 104. A configuration value may be any range or value that affects any operation or result of application program process 218, for example, an initial state, a parameter, a constant, a value for a variable, an instruction, an entry point, a pointer, a branch condition, a return value, a flag, or a message.

Update store 216 may be implemented on portable memory 120. Store 216 may include modules (with or without signatures) for transfer to environment store 202, or instructions or data for use by application program process 218. Data for use by process 218 may include additional or replacement signatures or sets of signatures for storage in permissions and preferences store 212.

Application program process 218 includes any conventional combination of processes for performing functions of a subsystem as discussed above. These functions may include surveillance, instrument monitoring, data capture, control, data processing, computation, analysis, graphics, reporting, advising, database management, and network communications. The inputs and outputs to perform these functions are not shown but may be implemented via communication with other subsystems 102 and 108 as discussed above. For example, configuration values may specify, determine, or direct the formation of one or more paths (e.g., 103, 109) for data communication between application program 218 and other subsystems.

A module may be stored in environment memory 106 (e.g., in store 202) as a set of components. Each component may include a data structure having fields, each field having a value. The arrangement of components may be contiguous or noncontiguous. When multiple modules include the same component, redundant copies of that component may be omitted from environment memory 106. A module may have a signature. Each component may have a signature. Components may be stored in any convenient arrangement, including, for example, as records of a database.

For example, data structure 300 of FIG. 3 includes several modules, each module having several components in any order. A first module may include components 302, 304 and 305. A second module may include components 303 and 305. The signature of each component may be stored with the component, for example, in a header field having a value for a precomputed cyclic redundancy code. Component 302, typical of others, includes a header 308 and a data field 310. A header includes fields having values that describe the component and the data portion of the component. Data may include values for reference (e.g., constants, or initial values as discussed above). Data may include portions that conform to standard formats such as Document Object Module (DOM), or Extended Markup Language (XML). Data may include portions that conform to a programming language for interpretation or execution (e.g., statements, instructions, objects, object code, or symbols (e.g., JAVA pCode)).

In the example implementation shown, header 308 includes fields as described in Table 1.

TABLE 1

| Field | Description |
| --- | --- |
| DATA TYPE 312 | An integer value that identifies the data field as containing data of a predefined type. For example, type values may include: Type values may include 1 = integer, 2 = floating point, 3 = string, 4 = executable object, 5–10 = records or data structures for different purposes or different processes of application program 218. |
| VERSION 314 | An integer value that describes the revision level of this component. |
| SIZE 316 | An integer value for the number of bytes occupied by the component. |
| APPLICATION MASK 318 | An integer value that describes a set of aircraft types that have been certified for hosting a system that would use this component. |
| STRING IDENTIFIER 320 | A string value that describes the component. |
| CRC IDENTIFIER 322 | An integer value computed by a conventional method from the value of the data field and, if desired, the header field. |

Data structure 300 may correspond to one module having components 302–305 and a module-level signature 306. Signature 306 may be a cyclic redundancy code calculated from all data of components 302–305. In an alternate implementation, signature 306 is an image-level signature, calculated from an entire image.

Use of the environment memory in combination with an application program reduces costs for deploying and maintaining a population of subsystems of the same general type. Consider, for example, that subsystem 104 is to be operable with a subsystem 108 of type A or type B and that both system configurations are to be certified by testing. If subsystem 104 is capable of operating with either type, the particular type may be identified in environment memory 106. Suppose that environment memory would include a module having components 302, 303, and 304 for type A and otherwise would include for type B a module having components 302, 303, and 305. If application program functions related to components 302 and 303 are independent of components 304 and 305, an application program may be certified for use with type B after tests limited to component 305. Consequently, testing of an application program for certified use with type B is simplified over prior art testing which may have involved testing all functions of the application program. When a new subsystem type C is defined for subsystem 108, testing of subsystem 104 to certify use with type C may be omitted when all components of the module or modules needed for type C have already been used with other certified configurations of the application program.

The system discussed above may be operated in an aircraft as avionics. The application program of a subsystem may perform avionics functions including, for example, navigation, flight management, mission command, communication, or control, or collision avoidance. For example, an air traffic and terrain collision avoidance system for use on a conventional aircraft, according to various aspects of the present invention, includes one or more environment memories and one or more replaceable subsystems as discussed above. An air traffic and terrain collision avoidance system may include conventional structures and functions as specified in DO-185A (as to traffic collision avoidance) and as specified in ARINC 900 (as to terrain avoidance). System 400 as a whole includes structures and performs methods as discussed in general above; and, includes portions that individually include structures and perform methods as discussed in general above.

For example, transponder unit 402 may be a replaceable subsystem installed in tray 440 to connect to environment memory 442. Environment memory 442 may include modules having components for describing functions of system 400 (e.g., available power for transmitting at various altitudes) and interfaces to other portions of system 400 (e.g., type of antenna 415 and type of processor unit 408). In an alternate implementation, a conventional transponder and tray are used; and, environment memory 442 is omitted.

Global positioning unit 404 may be a replaceable subsystem installed in tray 450 to connect to environment memory 452. Environment memory 452 may include modules having components for describing functions of system 400 (e.g., accuracy for reporting position to processor unit 408, or sensitivity of receivers in unit 404) and interfaces to other portions of system 400 (e.g., type of processor unit 408 and command sequences to be used with processor unit 408). In an alternate implementation, a conventional global positioning unit and tray are used; and, environment memory 452 omitted.

Weather radar unit 406 may be a replaceable subsystem installed in tray 460 to connect to environment memory 462. Environment memory 462 may include modules having components for describing functions of system 400 (e.g., type of antenna 422 and manner of updating the display unit 410) and interfaces to other portions of system 400 (e.g., type of display unit 410 and command sequences to be used with it).

Radar display unit 410 may be a replaceable subsystem installed in tray 480 to connect to environment memory 482. Environment memory 482 may include modules having components for describing functions of system 400 (e.g., number of sources of information to be displayed and manner of updating the display unit 410) and interfaces to other portions of system 400 (e.g., type of display unit 410, type of processor unit 408, and type of weather radar unit 406).

Terrain and traffic collision avoidance processor unit 408 may be a replaceable subsystem installed in tray 470 to connect to environment memory 472. Environment memory 472 may include one or more modules having components for describing functions of system 400 (e.g., aircraft performance capabilities to pull up, fuel consumption, or weight) and interfaces to other portions of system 400 (e.g., type of antennas 424 (e.g., directional) and 426 (e.g., omnidirectional), type of transponder unit 402, type of global positioning unit 404, type of radio altimeter 418, type of weather radar unit 406, type of vertical speed display 428, type of radar display unit 410, type of audio annunciator 430, and/or description of discrete and bus inputs 420 and discrete and bus outputs 432).

In operation, system 400 performs as follows after initialization. During initialization, each subsystem that has been installed at an interface having environment memory may conditionally read its environment memory as discussed above and operate in accordance with data read from the environment memory. The system then continuously determines the own aircraft data including altitude, velocity, and bearing; interrogates other aircraft to determine other aircraft altitude, velocity, and bearing; determines whether a threat of collision with other aircraft exists with reference to own aircraft altitude, velocity, and bearing and with other aircraft altitude, velocity, and bearing; displays own aircraft data including altitude, velocity, and bearing, and at least the altitude and bearing of other aircraft; determines own aircraft position; displays (e.g., on the radar display) a terrain map for the own aircraft position; determines whether a threat of collision with terrain or other aircraft exists with reference to the terrain map; and alerts the crew of threats of collision with other aircraft or with terrain. A subsystem having internal nonvolatile memory may determine that environment memory should be read into the internal nonvolatile memory by comparing a signature of the internal nonvolatile memory with a signature of the environment memory. The signatures calculated and compared may be image-level, module-level, and/or component-level. Reading environment memory into internal nonvolatile memory may be avoided when corresponding calculated and read signatures match.

In one implementation, environment memory 472 includes one module having an overall signature. The module comprises numerous components, each component comprising a respective signature. Preferably, each signature includes a value of the type known as a cyclic redundancy code. For each component, identification and validation of the component are simplified by maintaining a physical relationship between the component and its signature. The relationship may be between the signature and the component data, for example, storing the component's data contiguous with a header that includes the signature maintains a physical relationship between the signature and the data of the component. The relationship may be between the signature and a combination of the component data and header information, for example, calculating the signature on the basis of the component data and associated header information maintains a relationship between the header information and the component data.

A component may be validated at any time by calculating a signature; comparing the calculated signature with the signature maintained in association with the component; and considering the component validated when the signatures match. The signature of a component may serve to identify the component for purposes of testing or identifying the component, an aggregation of components, a module, an aggregation of modules, or an environment memory.

Figure 5:
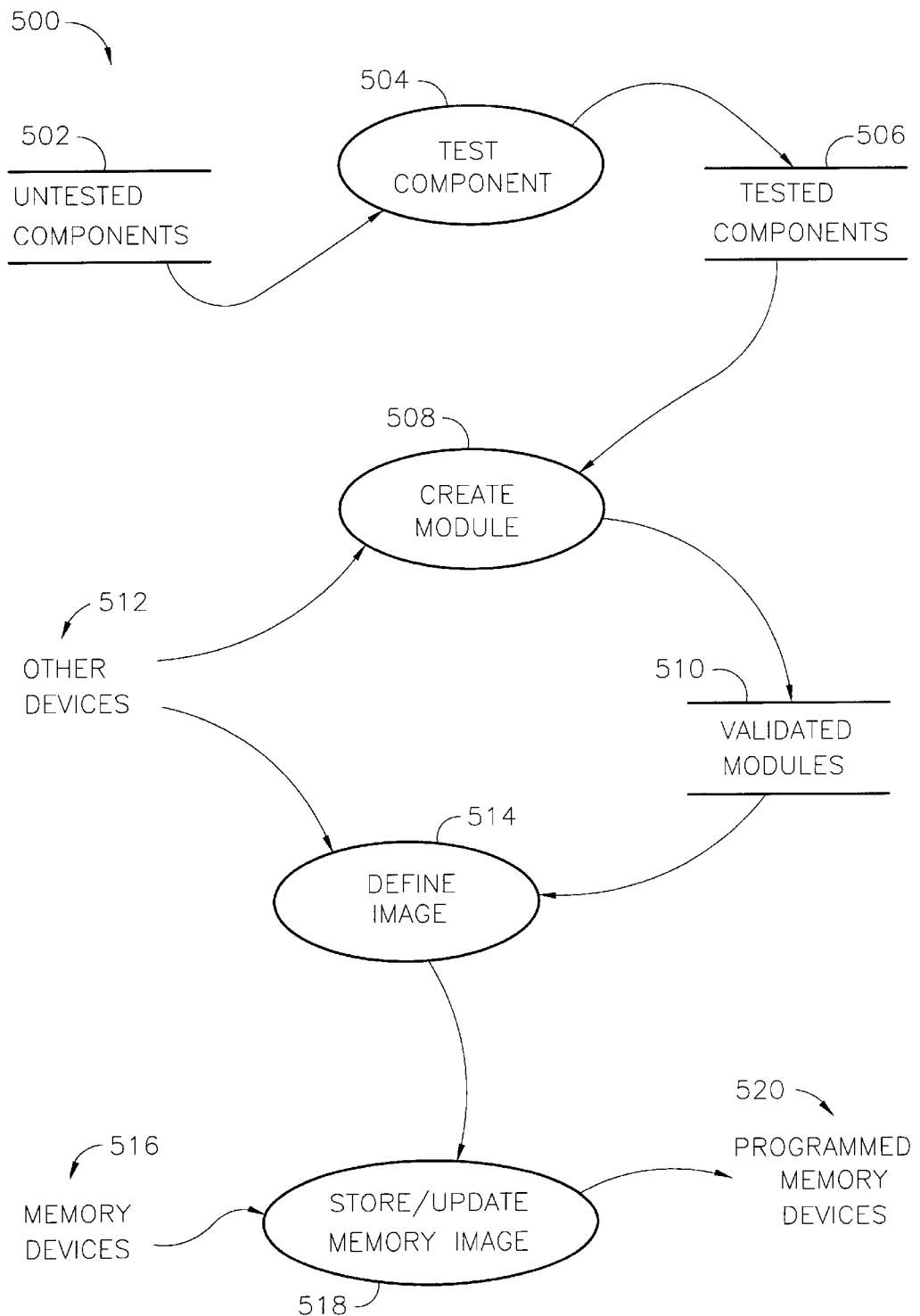
FIG. 5 is a data flow diagram of a method for preparing an environment memory according to various aspects of the present invention.

A method for preparing an environment memory, according to various aspects of the present invention, includes testing components, combining tested components into modules, storing modules in environment memory, and validating the environment memory. For example, method 500 of FIG. 5 includes test component process 504, create module process 508, define image process 514, and store/update memory image process 518. Each process may be performed whenever data (or devices) sufficient for its purposes becomes available. Method 500 accesses untested components store 502, tested components store 506, other values 512, and validated modules store 510. Method 500 also produces programmed memory devices 520 from memory devices 516.

A store for components and/or modules includes any conventional data storage mechanism (e.g., computer data storage on conventional media such as disks or tapes, one or more files or databases, or data distributed and stored via a network). Untested components store 502 is managed by administrative procedures to be distinct from stores 506 and 510 so as to reduce the chance of mistaking an untested component with a tested component or validated module. Maintaining a store distinct from another may include any conventional techniques such as avoiding physical commingling of data on the same storage media and/or restricting access (e.g., by physical restrictions, administrative restrictions (e.g., controlling knowledge of a password), or account access privilege restrictions).

Test component process 504 draws one or more untested components from store 502 and subjects them individually or in one or more sets to test procedures that confirm expected operations using the untested component(s). If test(s) pass, a copy of the untested component is stored in tested component store 506. The copy of the component(s) in untested components store 502 may be deleted. Tested components store 506 may include indicia describing the test (e.g., date, time, identity of the test procedure, facilities used in the test(s), or names of test and quality control technicians). In one embodiment, the signature of the component is stored contiguously with the component so that operations on a copy of the component (e.g., recall, store, delete, or move) maintain the relationship. The signature may be created by test component process 504. Each component in tested components store 506 is maintained in association with its respective signature. When tested components store 506 is implemented with a relational database, the signatures may be linked by any conventional mechanism to the components (e.g., common key values, field values, or conventional indexing). Test component process 504 may be implemented with or without user input (not shown). When interactive, a user may select one or more untested components to test, may specify the test procedures to be used, and may designate the destination for the tested component (e.g., a network address, or storage address).

Create module process 508 selects tested components from tested component store 506, accesses other values 512, arranges the tested components and other values as a module, calculates a signature for the module, and stores the result in validated modules 510. A module comprises one or more components and a signature for the module. A module may be validated at any time by calculating a signature for all components of the module and any other data to be included with the module (not shown); comparing the calculated signature with the signature maintained in association with the module; and if the signatures match, considering the module validated. The signature of a module may serve to identify the module for purposes of identifying the module, an aggregation of modules, or an environment memory. Create module process 508 may be implemented with or without user input (not shown). When interactive, a user may select one or more tested components, may specify the format or arrangement for preparing a desired type of module, and may designate the destination for the module (e.g., a network address, or storage address).

Define image process 514 selects validated modules from store 510 and may access other values 512 to prepare an image to be stored in a memory device to be used as all or part of an environment memory, as discussed above. Images may be provided to store/update process 518 in any conventional manner including intermediate storage (not shown) accessed at any time by the two processes. Define image process 514 may be implemented with or without user input (not shown). When interactive, a user may select one or more validated modules, may identify the other values to be accessed (e.g., date image was created, or format or arrangement for preparing a desired image), and may designate the destination for the module (e.g., a network address, identity of a particular store/update memory process, or a storage address).

Store/update memory image process 518 has access to (e.g., directs mounting of) one or more physical memory devices 516, stores the image defined by process 514 in an accessed memory device, and provides the resulting programmed memory device 520 for use as (or incorporation in) an environment memory as discussed above. Memory devices 516 may include any conventional devices including application specific integrated circuits; programmable read only memory; electrically programmable memory; nonvolatile memory; or data storage media (e.g., disk, tape, or semiconductor). The store operation of process 518 is an update when the accessed memory device 516 has data stored thereon that is preserved or when prior stored data is replaced (in full or in part) with the image defined by process 516. Store/update process 518 may be conducted for initial assembly of environment memory or for maintenance of existing environment memory (e.g., repair, or installing changes, or upgrades). In an alternate embodiment, store/update memory image process 518 provides computer automated design or manufacturing data in place of programmed memory devices 520. Such CAD/CAM data may include fuse maps, masks, or other wafer processing information sufficient to design or manufacture suitable memory devices from which the image may be recalled.

By maintaining a store of tested components 506, create module process 508 need not be accomplished by retesting needed untested components. By maintaining a store of validated modules 510, define image process 514 need not be accomplished with reference to untested components. Consequently, once a component is tested, it can be incorporated into any number of modules and images without repeating tests on the component. This result is facilitated by the simplicity of identifying a component (e.g., by its signature as opposed to its entirety) and validating a component or a module, as discussed above.

Figure 6:
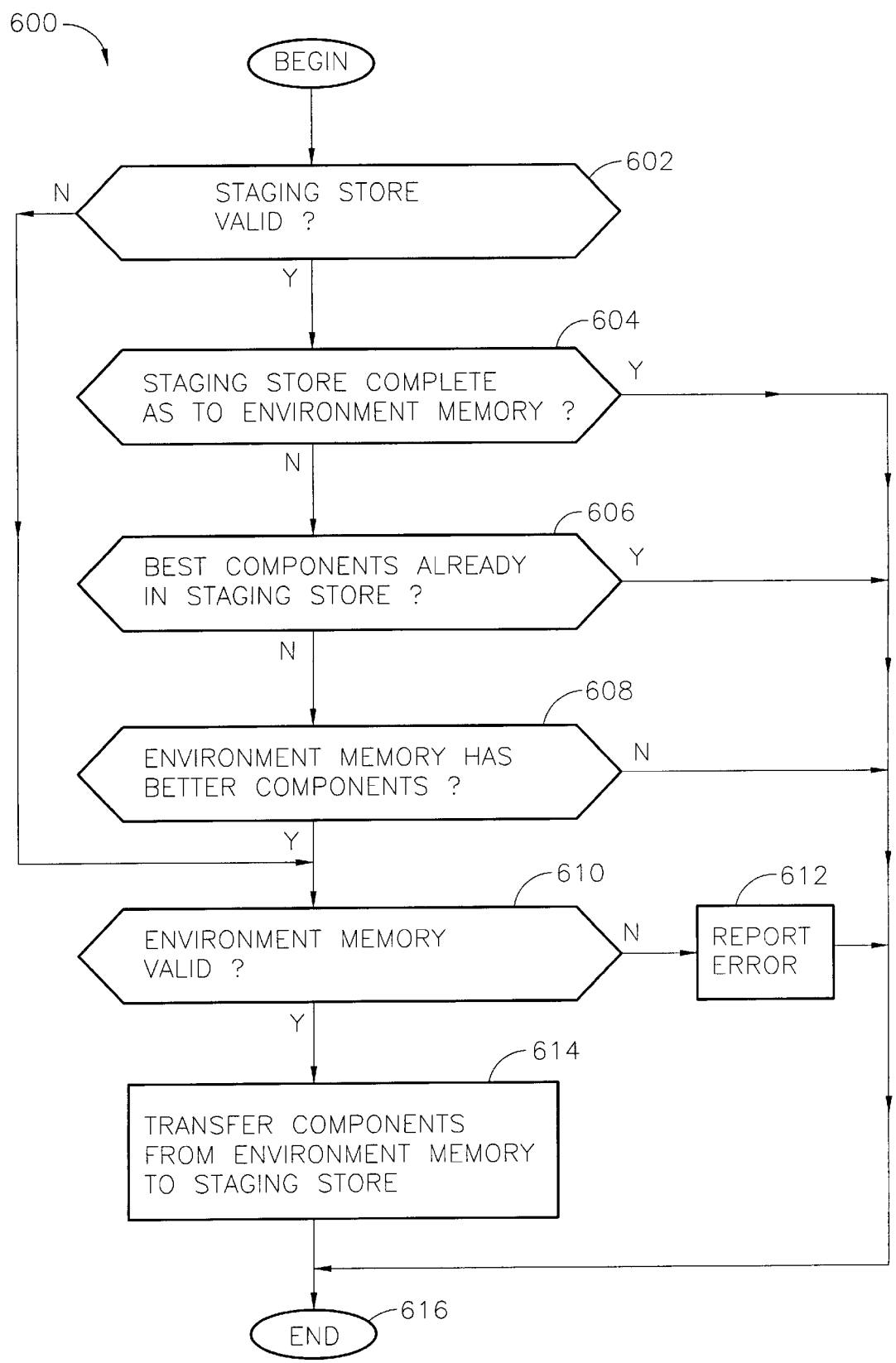
FIG. 6 is a flow chart of a method for transferring components from environment memory.

A signature may be used for validation and for identification of the data associated with the signature. By identifying and/or validating components already transferred from environment memory, a decision based on identification and/or validation may result in identifying, validating, and transferring one or more components from environment memory. A method for conditionally transferring components from environment memory may assure that the components used for subsystem operations are the best available. For example, method 600 of FIG. 6 may be performed by subsystem 104 as discussed above (e.g., processes 204, and 208). Method 600 transfers one or more components from environment memory 202 (106) to staging store 206 (105) as a consequence of testing several conditions. Each of the tests (602, 604, 606, 608, and 610) may be conducted with respect to each component individually, each module individually, each image individually, or by the entirety of environment memory 202 or entirety of staging store 206. Consequently, the transfer (614) may involve one component, one module, one image, or the entirety of environment memory. Whether to conduct the method with respect to component, module, image, or entirety may depend on the complexity of environment memory, time and energy budgets for method 600 and for transfers 614, and reliability considerations for tests and transfers.

If the contents of staging store 206 are valid (602), and complete (604) as to environment memory, no further transfers are necessary and control passes to end 616. Validity of staging store 206 may be determined by calculating a signature value from the contents of staging store; comparing the calculated signature value to a stored signature, stored in association with such contents; concluding that the staging store contents are valid if the comparison is successful (e.g., the calculated signature value does not differ significantly from the stored signature, or exact match). If invalid, the validity of environment memory may be tested (610).

The completeness of staging store 206 as to environment memory may be determined by testing the entirety of environment memory with the entirety of staging memory; or by testing corresponding portions of each. The location of corresponding portions may be determined in any conventional manner (e.g., predetermined direct addresses or ranges, or lists having indirect addresses). In either case, one of four approaches may be used, each similar to validity testing as discussed above, involving: (a) comparing a calculated signature value of environment memory to a stored signature value of staging store; (b) comparing a calculated signature value of environment memory to a calculated signature value of staging store; (c) comparing a signature value stored in environment memory to a signature value stored in staging store; or (d) comparing a signature value stored in environment memory with a calculated signature value of staging store.

In an alternate implementation, testing completeness may be omitted because a prior transfer transferred the entirety of environment memory to staging store. In other words when staging store is not valid (602) all components are transferred (614), possibly after testing validity of environment memory (610). If environment memory includes primary and backup components so that the subsystem may operate in a primary or one of several backup configurations, transfer of the entirety of environment memory may not be desired.

In yet another alternate implementation, staging store is always judged as incomplete (test 604 is omitted) to force a test (606) for preferred components. In still another implementation, completeness is determined by considering whether environment memory is identified as having the same signature as an environment memory used in an immediately prior configuration of the subsystem; and if so, staging store is complete else staging store is incomplete.

If staging store contents are valid and not complete, it is determined whether the best component has already been transferred to staging store. "Best" may be determined with reference to permissions and preferences store 212 as discussed above. For example, a signature value stored in permissions and preferences store 212 may be compared to a signature value stored in association with staging store 206. If no other component, module, or image is preferred over what is already stored in staging store 206, method 600 is complete (616).

Otherwise, it is determined (608) whether environment memory has a more preferred component, module, or image. For example, a signature value stored in permissions and preferences store 212 may be compared to (a) a signature value stored in environment memory; or (b) a calculated signature value of environment memory. If no "better" component, module, or image is available from environment memory, method 600 is complete (616).

Before transferring environment memory (e.g., by entirety, image, module, or component) into staging store, environment memory (or a portion thereof) is validated. Validation may have been accomplished in concert with identifying a "better" component as discussed above (608 item (b)). Validation comprises comparing a signature value stored in environment memory with a signature value calculated from environment memory. If the relevant portion of environment memory is not valid, an error message is reported (612). Otherwise, the desired entirety, image(s), module(s), or component(s) are transferred (614) from environment memory 202 to staging store 206 and method 600 is complete (616).

The foregoing description discusses preferred embodiments of the present invention which may be changed or modified without departing from the scope of the present invention as defined in the claims. While for the sake of clarity of description, several specific embodiments of the invention have been described, the scope of the invention is intended to be measured by the claims as set forth below.

What is claimed is:

1. A collision avoidance system comprising:
   means for determining own aircraft data including position, altitude, velocity, and bearing;
   means for interrogating an other aircraft to determine other aircraft data including position, altitude, velocity, and bearing;
   means for determining a threat of collision with the other aircraft in accordance with the own aircraft data and with the other aircraft data;
   means for displaying at least a portion of the own aircraft data and at least a portion of the other aircraft data;
   means for alerting a crew member of a threat of collision with the other aircraft; wherein:
   for at least one of the means for determining own aircraft data, means for interrogating, means for determining a threat of collision with the other aircraft, means for displaying own aircraft data, and the means for alerting a crew member:
   the at least one means is packaged in a replaceable unit for installation on the own aircraft at an interface, the interface having a first means for storing first content and a plurality of signature values, each signature value for a respective portion of the first content;

the at least one means further comprises:
second means for storing second content;
means for validating the second content with reference to at least one signature value of the first content;
means for updating the second content in accordance with the first content; and
means for operating the subsystem in accordance with the updated second content.

2. The system of claim 1 wherein the means for operating comprises:
an application program; and
means for establishing an initial configuration of the application program in accordance with the updated second content.

3. The system of claim 1 wherein the means for operating comprises:
means for establishing in accordance with the updated second content a path for data communication between the application program and at least one of the means for determining own aircraft data, means for interrogating, means for determining a threat of collision with other aircraft, means for displaying own aircraft data, means for determining own aircraft position, means for displaying a terrain map, means for determining a threat of collision with terrain, and the means for alerting a crew member.

4. The system of claim 1 wherein:
the means for displaying further comprises means for displaying a terrain map in accordance with own aircraft position;
the means for determining a threat of collision further comprises means for determining a threat of collision with terrain in accordance with the terrain map; and
the means for alerting further comprises means for alerting a crew member of a threat of collision with terrain.

5. The system of claim 1 wherein each portion of the first content comprises a header comprising the respective signature value.

6. The system of claim 1 wherein each signature value comprises a respective cyclic redundancy code.

7. The system of claim 1 wherein the subsystem means further comprises means for receiving data and for writing received data into the means for storing, the received data being from a provided portable memory, the received data comprising a second plurality of signature values.

8. A system comprising:
a plurality of subsystems coupled to cooperate;
first means for storing first content and a plurality of first signature values, each first signature associated with a respective portion of the first content;
subsystem means for performing an avionics program, the subsystem means comprising:
means for coupling the subsystem means to at least one of the plurality of other subsystems;
means for accessing the first means for storing to validate the first content with reference to at least one of the plurality of first signature values;
second means for storing second content and a second signature;
means for accessing the second means for storing to validate the second content with reference to the second signature;
means for updating the second content in accordance with at least a portion of the first content; and
means for performing the avionics program in accordance with the updated second content.

9. The system of claim 8 wherein the means for performing comprises means for establishing an initial configuration of the avionics program in accordance with the updated second content.

10. The system of claim 8 wherein the means for performing comprises means for establishing in accordance with the updated second content a path for data communication between the avionics program and at least one of the other subsystems.

11. The system of claim 8 wherein each portion of the first content comprises a header comprising the respective signature value.

12. The system of claim 8 wherein each signature value comprises a respective cyclic redundancy code.

13. The system of claim 8 wherein the subsystem means further comprises means for receiving data and for writing received data into the first means for storing, the received data being from a provided portable memory, the received data comprising a second plurality of signature values.

14. A system for operation in an aircraft, the system comprising:
a plurality of subsystems coupled to cooperate;
an environment memory comprising content of the environment memory and a plurality of first signatures, each first signature associated with at least one of a component, a module, an image, and an entirety of the content of the environment memory; and
a subsystem of the plurality comprising:
a nonvolatile memory comprising content of the nonvolatile memory and a signature value of the content of the nonvolatile memory;
an interface that facilitates removal and replacement of the subsystem; and
a processor having access to the environment memory via the interface; wherein the processor:
accesses each first signature for at least one of: identifying the associated component, module, image, or entirety; and validating the associated component, module, image, or entirety;
validates the content of the nonvolatile memory with reference to the signature value of the content of the nonvolatile memory;
validates the content of the environment memory with reference to the plurality of first signatures;
updates the content of the nonvolatile memory in accordance with the content of the environment memory; and
performs an avionics program in accordance with the updated content of the nonvolatile memory.

15. The system of claim 14 wherein a first signature is associated with an entirety of the content of the environment memory and each other first signature is associated with a respective component of the content of the environment memory.

16. The system of claim 14 wherein the signature value of the content of the nonvolatile memory is stored in a header of the content of the nonvolatile memory.

17. The system of claim 16 wherein a first signature is associated with an entirety of the content of the nonvolatile memory and each other first signature is associated with a respective component of the content of the environment memory.

18. The system of claim 14 wherein the plurality of subsystems are installed on an aircraft and cooperate for alerting a crew member of the aircraft for collision avoidance.

19. The system of claim 18 wherein the avionics program provides an alert for at least one of traffic collision avoidance and terrain collision avoidance.

20. The system of claim 14 wherein the subsystem of the plurality comprises a transponder.

21. The system of claim 14 wherein the avionics program performs a global positioning system function.

22. The system of claim 14 wherein the subsystem of the plurality provides a weather radar function.

23. The system of claim 14 wherein the subsystem of the plurality comprises a display.

24. The system of claim 23 wherein the display provides a radar display.

25. The system of claim 14 wherein the subsystem further comprises a reader of provided portable memory for updating the content of the environment memory.

26. The system of claim 14 wherein the processor updates the content of the nonvolatile memory in accordance with determining whether the nonvolatile memory is incomplete.

27. The system of claim 14 wherein the processor updates the content of the nonvolatile memory in accordance with determining that the content of the environment memory comprises at least one of a component, a module, and an image any of which is not currently stored in the nonvolatile memory.

28. The system of claim 14 wherein:
the subsystem further comprises a store having a preferred signature value corresponding to at least one of a preferred component, a preferred module, and a preferred image;
the content of the environment memory comprises the at least one of preferred component, preferred module, and preferred image; and
the processor updates the nonvolatile memory in response to determining with reference to the preferred signature that the at least one of preferred component, preferred module, and preferred image is not currently stored in the nonvolatile memory.

29. The system of claim 14 wherein the processor updates an entirety of the content of the nonvolatile memory in accordance with an entirety of the content of the environment memory.

30. The system of claim 14 wherein the processor updates an image of the content of the nonvolatile memory in accordance with an image of the content of the environment memory.

31. The system of claim 14 wherein the processor updates a module of the content of the nonvolatile memory in accordance with a module of the content of the environment memory.

32. The system of claim 14 wherein the processor updates a component of the content of the nonvolatile memory in accordance with a component of the content of the environment memory.

33. A method for operating an avionics subsystem after installing the subsystem at an interface between the subsystem and a plurality of other subsystems, the interface having a first side comprising the subsystem and a second side comprising the other subsystems, the subsystem having a first memory, the second side having a second memory, the method performed by the subsystem comprising:
a step for determining whether a first signature of the first memory is inconsistent with a second signature of the second memory;
a step for operating without updating when inconsistency does not exist;
a step for updating in response to inconsistency, the step for updating comprising a method having:
a step for transferring data associated with the second signature from the second memory to the first memory; and
a step for establishing in accordance with the transferred data a path for data communication between the avionics subsystem and at least one of the other subsystems; and
a step for performing an avionics program for communication via the path.

34. The method of claim 33 wherein the data comprises a header, the header comprising the second signature.

35. The method of claim 33 wherein at least one of the first signature and the second signature comprises a cyclic redundancy code.

36. The method of claim 33 wherein the step for determining further comprises a step for determining whether the first signature is inconsistent with the second signature on a basis of whether the first signature is identical to the second signature.

37. The method of claim 33 further comprising a step for receiving second data and for writing second data into the second memory.

38. The method of claim 37 wherein the step for receiving second data comprises a step for reading second data from a portable memory device.

39. A method for operating a subsystem of an avionics system, the system comprising a plurality of subsystems, the subsystem being packaged as a replaceable unit for installation via an interface of the subsystem, the subsystem comprising a processor and a first memory, the system comprising a second memory accessed by the subsystem via the interface, the method performed by a processor of the subsystem, the method comprising:
a step for determining a first calculated signature of a first content of the first memory;
a step for comparing the first calculated signature with a first stored signature stored in the first memory to conclude validity of the first content;
a step for determining a second calculated signature of a second content of the second memory;
a step for comparing the second calculated signature with a second stored signature stored in the second memory to conclude validity of the second content;
a step for updating the first content in accordance with the second content in response to determining that the first content is valid and the second content is valid and a difference exists among at least two of the first calculated signature, the second calculated signature, the first stored signature, and the second stored signature; and
a step for performing an avionics program in accordance with the updated first content.

40. The method of claim 39 wherein the step for comparing the first calculated signature comprises a step for recalling the first stored signature from a header of the first content.

41. The method of claim 39 wherein the step for comparing the second calculated signature comprises a step for recalling the second stored signature from a header of the second content.

42. The method of claim 39 wherein:
the second stored signature is a member of a set of stored signatures each associated with a respective component of the second content; and
the step for comparing the second calculated signature comprises a step for repeating comparing to conclude validity of the second content with reference to each signature of the set.

43. The method of claim 39 wherein:

the second stored signature is a member of a set of stored signatures each associated with a respective module of the second content; and the step for comparing the second calculated signature comprises a step for repeating comparing to conclude validity of the second content with reference to each signature of the set.

44. The method of claim 39 wherein:

the second stored signature is a member of a set of stored signatures each associated with a respective image of the second content; and the step for comparing the second calculated signature comprises a step for repeating comparing to conclude validity of the second content with reference to each signature of the set.

45. A method for operating a subsystem of an avionics system, the system comprising a plurality of subsystems, the subsystem being packaged as a replaceable unit for installation via an interface of the subsystem, the subsystem comprising a processor and a first memory, the system comprising a second memory accessed by the subsystem via the interface, the method performed by a processor of the subsystem, the method comprising:

a step for determining whether first content of the first memory is not complete, determining being with reference to a preferences store of the subsystem;

a step for transferring a portion of the second content from the second memory to the first memory, the portion of the second content being identified by a signature value; and a step for repeating the step of transferring until a plurality of portions have been transferred, each portion being identified by a respective signature value.

46. The method of claim 45 wherein each signature value is stored in association with the respective portion of the second content.

47. The method of claim 45 wherein each signature value is stored in a header of the respective portion of the second content.

48. The method of claim 45 wherein a respective portion of the second content comprises at least one of a component, a module, and an image.

49. A system for operation in an aircraft, the system comprising:

a. a plurality of subsystems coupled to cooperate;

b. an environment memory comprising content of the environment memory and a plurality of first signatures, each first signature associated with at least one of a component, a module, an image, and an entirety of the content of the environment memory; and c. a subsystem of the plurality comprising:

(1) a nonvolatile memory comprising content of the nonvolatile memory and a signature value of the content of the nonvolatile memory;

(2) an interface that facilitates removal and replacement of the subsystem; and (3) a processor having access to the environment memory via the interface; wherein the processor validates the content of the nonvolatile memory with reference to the signature value of the content of the nonvolatile memory, validates the content of the environment memory with reference to the plurality of first signatures, updates the content of the nonvolatile memory in accordance with the content of the environment memory, and performs an avionics program in accordance with the updated content of the nonvolatile memory.

50. The system of claim 49 wherein at least one first signature is stored in a header of the content of the environment memory.

51. The system of claim 49 wherein the processor accesses each first signature for at least one of:

a. identifying the associated component, module, image, or entirety; and b. validating the associated component, module, image, or entirety.

52. The system of claim 49 wherein:

a. the nonvolatile memory comprises a plurality of second signatures, each second signature associated with at least one of a component, a module, an image, and an entirety of the content of the nonvolatile memory; and b. the processor accesses each second signature for at least one of:

(1) identifying the associated component, module, image, or entirety; and (2) validating the associated component, module, image, or entirety.

53. The system of claim 49 wherein the signature of the content of the nonvolatile memory is associated with an entirety of the content of the nonvolatile memory and each second signature is associated with a component of the content of the nonvolatile memory.

54. The system of claim 49 wherein the plurality of subsystems are installed on an aircraft and cooperate for alerting a crew member of the aircraft for collision avoidance.

55. The system of claim 49 wherein the avionics program provides an alert for at least one of traffic collision avoidance and terrain collision avoidance.

56. The system of claim 49 wherein the subsystem of the plurality comprises a transponder.

57. The system of claim 49 wherein the application program performs a global positioning system function.

58. The system of claim 49 wherein the subsystem of the plurality provides a weather radar function.

59. The system of claim 49 wherein the subsystem of the plurality comprises a display.

60. The system of claim 49 wherein the display provides a radar display.

61. The system of claim 49 wherein the subsystem comprises a reader of provided portable memory for updating the content of the environment memory.

62. The system of claim 49 wherein the processor updates the content of the nonvolatile memory in accordance with determining whether the nonvolatile memory is incomplete.

63. The system of claim 49 wherein the processor updates the content of the nonvolatile memory in accordance with determining that the content of the environment memory comprises at least one of a component, a module, and an image any of which is not currently stored in the nonvolatile memory.

64. The system of claim 49 wherein:

a. the subsystem further comprises a store having a preferred signature value corresponding to at least one of a preferred component, a preferred module, and a preferred image;

b. the content of the environment memory comprises the at least one of preferred component, preferred module, and preferred image; and c. the processor updates the nonvolatile memory in response to determining with reference to the preferred signature that the at least one of preferred component, preferred module, and preferred image is not currently stored in the nonvolatile memory.

65. The system of claim 49 wherein the processor updates an entirety of the content of the nonvolatile memory in accordance with an entirety of the content of the environment memory.

66. The system of claim 49 wherein the processor updates an image of the content of the nonvolatile memory in accordance with an image of the content of the environment memory.

67. The system of claim 49 wherein the processor updates a module of the content of the nonvolatile memory in accordance with a module of the content of the environment memory.

68. The system of claim 49 wherein the processor updates a component of the content of the nonvolatile memory in accordance with a component of the content of the environment memory.

69. A method for operating an avionics subsystem after installing the subsystem at an interface between the subsystem and a plurality of other subsystems, the interface having a first side comprising the subsystem and a second side comprising the other subsystems, the subsystem having a first memory, the second side having a second memory, the method performed by the subsystem comprising:

determining whether a first signature of the first memory is inconsistent with a second signature of the second memory;

operating without updating when inconsistency does not exist;

updating in response to inconsistency, updating comprising a method including:

transferring data associated with the second signature from the second memory to the first memory; and establishing in accordance with the transferred data a path for data communication between the avionics subsystem and at least one of the other subsystems; and performing an avionics program for communication via the path.

70. The method of claim 69 wherein the data comprises a header, the header comprising the second signature.

71. The method of claim 69 wherein at least one of the first signature and the second signature comprises a cyclic redundancy code.

72. The method of claim 69 wherein determining further comprises determining whether the first signature is inconsistent with the second signature on a basis of whether the first signature is identical to the second signature.

73. The method of claim 69 further comprising receiving second data and writing second data into the second memory.

74. The method of claim 73 wherein receiving second data comprises reading second data from a portable memory device.

75. A method for operating a subsystem of an avionics system, the system comprising a plurality of subsystems, the subsystem being packaged as a replaceable unit for installation via an interface of the subsystem, the subsystem comprising a processor and a first memory, the system comprising a second memory accessed by the subsystem via the interface, the method performed by a processor of the subsystem, the method comprising:

determining a first calculated signature of a first content of the first memory;

comparing the first calculated signature with a first stored signature stored in the first memory to conclude validity of the first content;

determining a second calculated signature of a second content of the second memory;

comparing the second calculated signature with a second stored signature stored in the second memory to conclude validity of the second content;

updating the first content in accordance with the second content in response to determining that the first content is valid and the second content is valid and a difference exists among at least two of the first calculated signature, the second calculated signature, the first stored signature, and the second stored signature; and performing an avionics program in accordance with the updated first content.

76. The method of claim 75 wherein comparing the first calculated signature comprises recalling the first stored signature from a header of the first content.

77. The method of claim 75 wherein comparing the second calculated signature comprises recalling the second stored signature from a header of the second content.

78. The method of claim 75 wherein:

the second stored signature is a member of a set of stored signatures each associated with a respective component of the second content; and comparing the second calculated signature comprises repeating comparing to conclude validity of the second content with reference to each signature of the set.

79. The method of claim 75 wherein:

the second stored signature is a member of a set of stored signatures each associated with a respective module of the second content; and comparing the second calculated signature comprises repeating comparing to conclude validity of the second content with reference to each signature of the set.

80. The method of claim 75 wherein:

the second stored signature is a member of a set of stored signatures each associated with a respective image of the second content; and comparing the second calculated signature comprises repeating comparing to conclude validity of the second content with reference to each signature of the set.

81. A method for operating a subsystem of an avionics system, the system comprising a plurality of subsystems, the subsystem being packaged as a replaceable unit for installation via an interface of the subsystem, the subsystem comprising a processor and a first memory, the system comprising a second memory accessed by the subsystem via the interface, the method performed by a processor of the subsystem, the method comprising:

determining whether first content of the first memory is not complete, determining being with reference to a preferences store of the subsystem;

transferring a portion of the second content from the second memory to the first memory, the portion of the second content being identified by a signature value; and repeating the step of transferring until a plurality of portions have been transferred, each portion being identified by a respective signature value.

82. The method of claim 81 wherein each signature value is stored in association with the respective portion of the second content.

83. The method of claim 81 wherein each signature value is stored in a header of the respective portion of the second content.

84. The method of claim 81 wherein a respective portion of the second content comprises at least one of a component, a module, and an image.

85. A subsystem for operation in a system in accordance with a provided memory, the subsystem comprising:
  a. a nonvolatile memory comprising content of the nonvolatile memory and a signature value of the content of the nonvolatile memory;
  b. an interface that facilitates removal and replacement of the subsystem, the interface providing access from the subsystem to the provided memory, the provided memory comprising content of the provided memory and a plurality of first signatures, each first signature associated with at least one of a component, a module, an image, and an entirety of the content of the provided memory; and
  c. a processor having access to the provided memory via the interface; wherein the processor validates the content of the nonvolatile memory with reference to the signature value of the content of the nonvolatile memory, validates the content of the provided memory with reference to the plurality of first signatures, updates the content of the nonvolatile memory in accordance with the content of the provided memory, and performs an avionics program in accordance with the updated content of the nonvolatile memory.

86. The system of claim 85 wherein at least one first signature is stored in a header of the content of the environment memory.

87. The system of claim 85 wherein the processor accesses each first signature for at least one of:
  a. identifying the associated component, module, image, or entirety; and
  b. validating the associated component, module, image, or entirety.

88. The system of claim 85 wherein:
  a. the nonvolatile memory comprises a plurality of second signatures, each second signature associated with at least one of a component, a module, an image, and an entirety of the content of the nonvolatile memory; and
  b. the processor accesses each second signature for at least one of:
    (1) identifying the associated component, module, image, or entirety; and
    (2) validating the associated component, module, image, or entirety.

89. The system of claim 85 wherein the signature of the content of the nonvolatile memory is associated with an entirety of the content of the nonvolatile memory and each second signature is associated with a component of the content of the nonvolatile memory.

90. The system of claim 85 wherein the plurality of subsystems are installed on an aircraft and cooperate for alerting a crew member of the aircraft for collision avoidance.

91. The system of claim 85 wherein the avionics program provides an alert for at least one of traffic collision avoidance and terrain collision avoidance.

92. The system of claim 85 wherein the subsystem of the plurality comprises a transponder.

93. The system of claim 85 wherein the application program performs a global positioning system function.

94. The system of claim 85 wherein the subsystem of the plurality provides a weather radar function.

95. The system of claim 85 wherein the subsystem of the plurality comprises a display.

96. The system of claim 85 wherein the display provides a radar display.

97. The system of claim 85 wherein the subsystem comprises a reader of provided portable memory for updating the content of the environment memory.

98. The system of claim 85 wherein the processor updates the content of the nonvolatile memory in accordance with determining whether the nonvolatile memory is incomplete.

99. The system of claim 85 wherein the processor updates the content of the nonvolatile memory in accordance with determining that the content of the environment memory comprises at least one of a component, a module, and an image any of which is not currently stored in the nonvolatile memory.

100. The system of claim 85 wherein:
  a. the subsystem further comprises a store having a preferred signature value corresponding to at least one of a preferred component, a preferred module, and a preferred image;
  b. the content of the environment memory comprises the at least one of preferred component, preferred module, and preferred image; and
  c. the processor updates the nonvolatile memory in response to determining with reference to the preferred signature that the at least one of preferred component, preferred module, and preferred image is not currently stored in the nonvolatile memory.

101. The system of claim 85 wherein the processor updates an entirety of the content of the nonvolatile memory in accordance with an entirety of the content of the environment memory.

102. The system of claim 85 wherein the processor updates an image of the content of the nonvolatile memory in accordance with an image of the content of the environment memory.

103. The system of claim 85 wherein the processor updates a module of the content of the nonvolatile memory in accordance with a module of the content of the environment memory.

104. The system of claim 85 wherein the processor updates a component of the content of the nonvolatile memory in accordance with a component of the content of the environment memory.

* * * * *